(12) United States Patent
Kishida et al.

(10) Patent No.: US 10,191,317 B2
(45) Date of Patent: Jan. 29, 2019

(54) DISPLAY APPARATUS

(71) Applicant: Japan Display Inc., Tokyo (JP)

(72) Inventors: Keiichi Kishida, Tokyo (JP); Naruo Hashino, Tokyo (JP); Takahiro Ono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/658,925

(22) Filed: Jul. 25, 2017

(65) Prior Publication Data

US 2018/0031899 A1 Feb. 1, 2018

(30) Foreign Application Priority Data

Jul. 26, 2016 (JP) .................. 2016-146508

(51) Int. Cl.
*G02F 1/1333* (2006.01)
*G02F 1/1335* (2006.01)
*F21V 8/00* (2006.01)

(52) U.S. Cl.
CPC ....... *G02F 1/133308* (2013.01); *G02B 6/005* (2013.01); *G02F 1/133528* (2013.01); *G02B 6/0088* (2013.01); *G02F 2001/133317* (2013.01); *G02F 2202/28* (2013.01)

(58) Field of Classification Search
CPC .......... G02F 1/1333; G02F 1/1335; G02F 1/133308; G02F 1/133528; G02F 1/13338; G02F 1/133553; G02F 1/1336; G02F 1/133603; G02F 1/133615; G02F 1/133524; G02F 1/133608; G02F 2001/133311; G02F 2001/13317; G02F 2001/133314; G02F 2001/133325; G02F 2001/133331; G02F 2001/13332; G02F 2001/133531; G02F 2202/28; G02F 2201/503; G02F 2201/46; G02B 6/0088; G02B 6/0055; G02B 6/0011; G02B 6/0043; G02B 6/00; B23B 7/12; B23B 2405/00; B23B 37/12; B23B 2363/00; B23B 2457/20; B23B 2457/208; C09J 163/00
See application file for complete search history.

(56) References Cited

U.S. PATENT DOCUMENTS

| | | | | |
|---|---|---|---|---|
| 8,830,417 B2 * | 9/2014 | Oohira | ............. | G02F 1/133308 349/12 |
| 2015/0177548 A1 * | 6/2015 | Jeon | ................. | G02F 1/133308 349/12 |

FOREIGN PATENT DOCUMENTS

JP 2014-052447 A 3/2014

* cited by examiner

*Primary Examiner* — Thoi Duong
(74) *Attorney, Agent, or Firm* — K&L Gates LLP

(57) ABSTRACT

According to an aspect, a display apparatus includes: a display panel including a substrate provided with a display functional layer, and a polarizing plate; an illuminator configured to output light to the display panel; and a frame that surrounds sides of the illuminator, and to which the substrate is bonded at a top portion of the frame through an adhesive member. The polarizing plate is provided on a surface of the substrate to which the frame is bonded, and is arranged on an inner side of the frame than the adhesive member in planar view.

9 Claims, 7 Drawing Sheets

US 10,191,317 B2

DISPLAY APPARATUS

CROSS-REFERENCE TO RELATED APPLICATIONS

This application claims priority from Japanese Application No. 2016-146508, filed on Jul. 26, 2016, the contents of which are incorporated by reference herein in its entirety.

BACKGROUND

1. Technical Field

The present disclosure relates to a display apparatus.

2. Description of the Related Art

Widely known are display apparatuses including: a display panel that displays an image, a backlight that outputs light to the display panel, and a backlight frame surrounding the side surfaces of the display panel and the backlight. In the display device described in Japanese Patent Application Laid-open Publication No. 2014-52447 (JP-A-2014-52447), a display panel (display unit) is fixed to a backlight frame and a backlight with its side surfaces surrounded by the backlight frame. The display device further includes a surface panel covering the front surface of the display panel. The rear surface of the surface panel is fixed to the backlight frame with a first fixing member.

The display device disclosed in JP-A-2014-52447 includes the backlight frame surrounding the display panel. This configuration may possibly make it difficult to downsize the display device. The display device disclosed in JP-A-2014-52447 further includes a second fixing member between the backlight frame and a rear polarizing plate of the display panel. An end of the rear polarizing plate is exposed from the second fixing member. As a result, the rear polarizing plate may possibly be damaged in an assembly process of the display device.

SUMMARY

According to an aspect, a display apparatus includes: a display panel including a substrate provided with a display functional layer, and a polarizing plate; an illuminator configured to output light to the display panel; and a frame that surrounds sides of the illuminator, and to which the substrate is bonded at a top portion of the frame through an adhesive member. The polarizing plate is provided on a surface of the substrate to which the frame is bonded, and is arranged on an inner side of the frame than the adhesive member in planar view.

DETAILED DESCRIPTION

Figure 1:
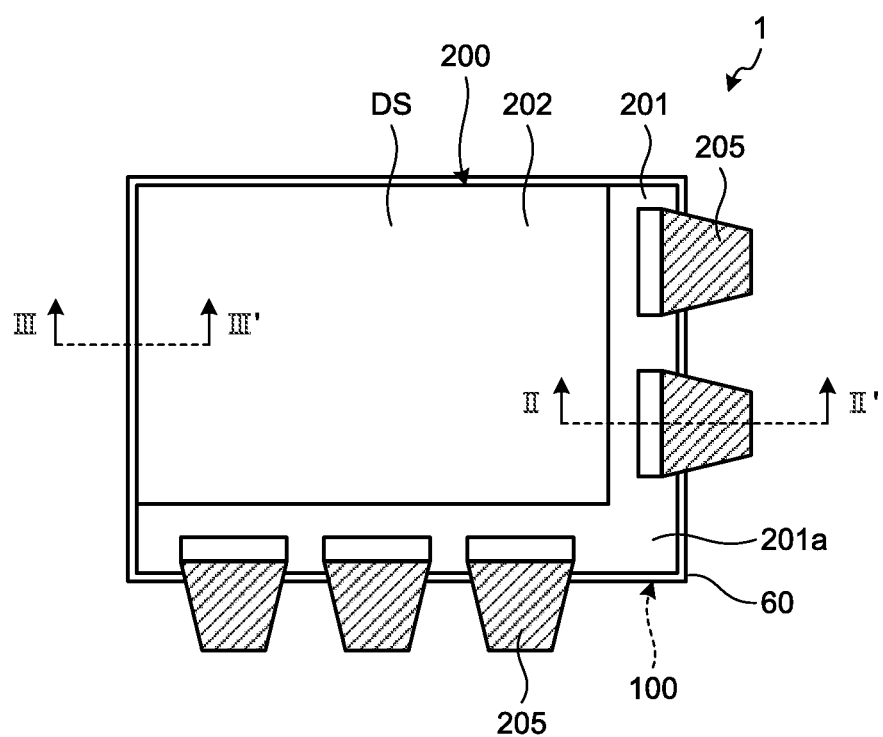
FIG. 1 is a plan view of a display apparatus according to a first embodiment of the present disclosure.

Exemplary aspects (embodiments) to embody the present disclosure are described below in detail with reference to the accompanying drawings. Contents described in the embodiments below are not intended to limit the present invention. Components described below include components easily conceivable by those skilled in the art and components substantially identical therewith. The components described below may be appropriately combined. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the figures, components similar to those previously described with reference to preceding figures are denoted by like reference numerals, and overlapping explanation thereof may be appropriately omitted. In this disclosure, when an element is described as being "on" another element, the element can be directly on the other element, or there can be one or more elements between the element and the other element.

First Embodiment

Figure 2:
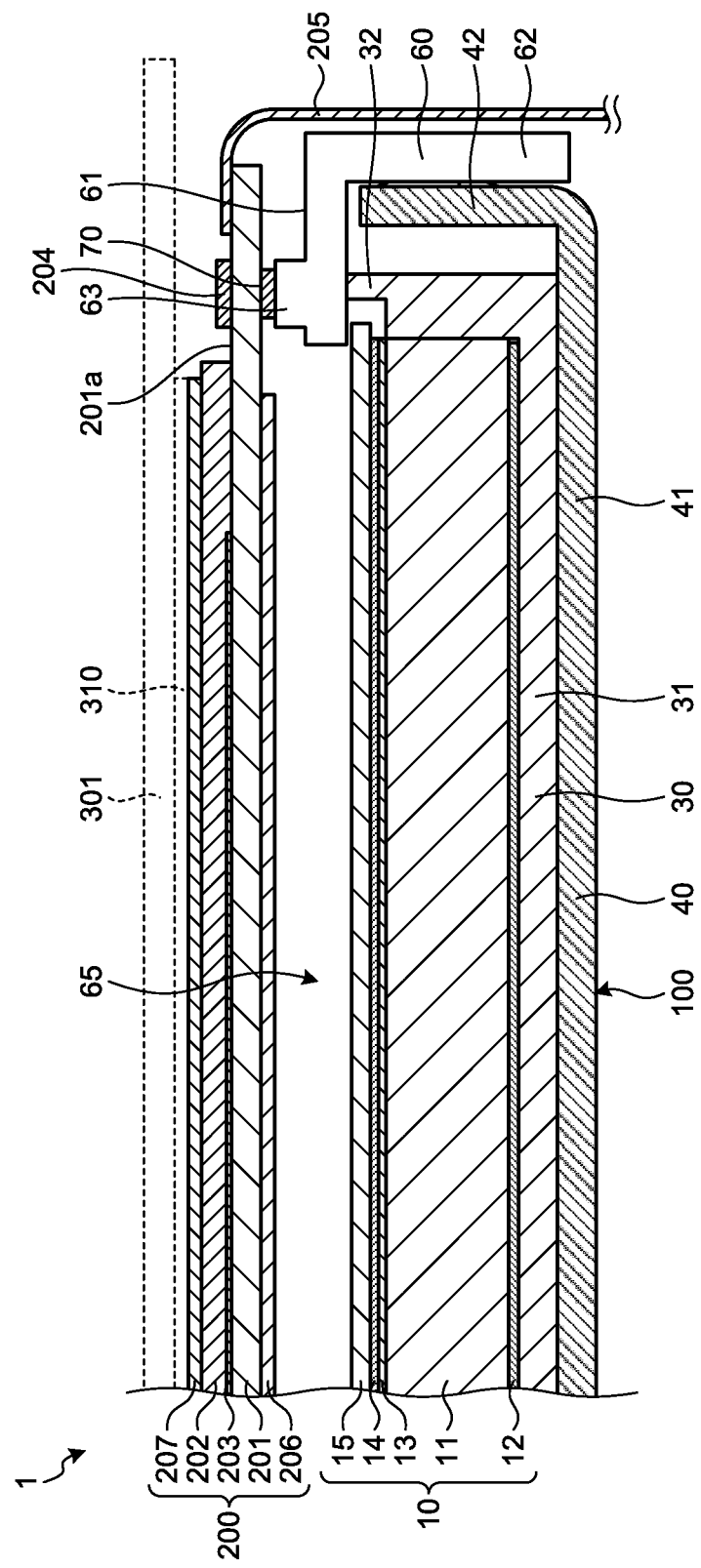
FIG. 2 is a sectional view along line II-II' in FIG. 1.
Figure 3:
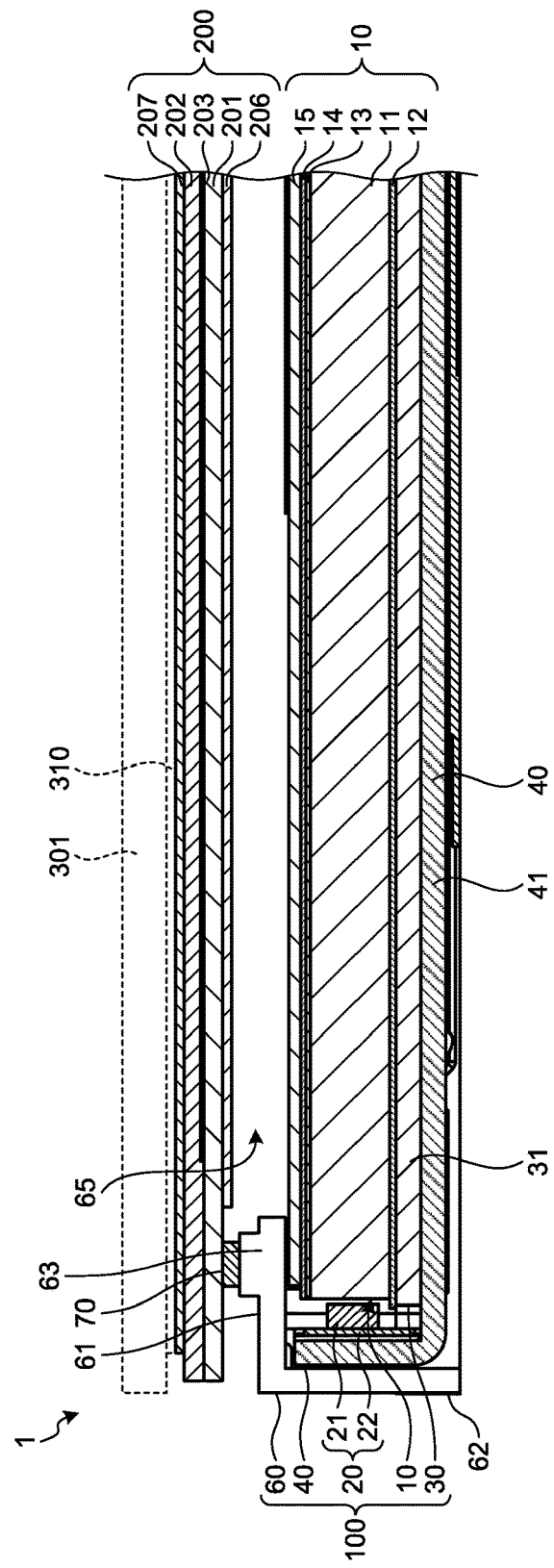
FIG. 3 is a sectional view along line III-III' in FIG. 1.

FIG. 1 is a plan view of a display apparatus according to a first embodiment of the present disclosure. FIG. 2 is a sectional view along line II-II' in FIG. 1. FIG. 3 is a sectional view along line III-III' in FIG. 1. To be specific, FIG. 2 is a sectional view of an end of a display apparatus 1 on the side provided with a flexible printed circuit board 205. FIG. 3 is a sectional view of an end of the display apparatus 1 on the side provided with a light source 20. As illustrated in FIGS. 1 to 3, the display apparatus 1 according to the present embodiment includes a display panel 200, a backlight (illuminator) 100, and a backlight frame 60. The display apparatus 1, for example, causes the display panel 200 to modulate light output from the backlight 100, thereby displaying an image on a display surface DS.

The following describes the arrangement of members assuming: a direction from the backlight 100 toward the display panel 200 is an upper direction; a direction from the display panel 200 toward the backlight 100 is a downward direction; and positions in the horizontal direction orthogonal to the vertical direction are sides. The display panel 200 includes a first substrate 201, a second substrate 202, a liquid crystal layer 203, a first polarizing plate 206, and a second polarizing plate 207. The second substrate 202 is arranged so as to face the first substrate 201 with the liquid crystal layer 203 interposed therebetween. The first polarizing plate 206 is provided on the bottom surface of the first substrate 201. The second polarizing plate 207 is provided on the top surface of the second substrate 202.

As illustrated in FIG. 1, the first substrate 201 has a terminal unit 201a extending outward of the outer edge of the second substrate 202. The flexible printed circuit boards 205 are coupled to the terminal unit 201a. As illustrated in FIG. 2, the flexible printed circuit boards 205 extend toward the bottom surface side of the display apparatus 1 along the backlight frame 60, which will be described later. The display panel 200 can be coupled to an external drive circuit via the flexible printed circuit boards 205.

As illustrated in FIG. 2, the terminal unit 201a may be provided with a display control integrated circuit (IC) 204. The display control IC 204 receives image signals from the external drive circuit via the flexible printed circuit boards 205. The display control IC 204 controls orientation (modulation amount) of liquid crystals in the liquid crystal layer 203 in accordance with the image signals. Light output from the backlight 100 passes through the first polarizing plate 206 to enter the liquid crystal layer 203, and is modulated by the liquid crystal layer 203. The light modulated by the liquid crystal layer 203 passes through the second polarizing plate 207 and is recognized as an image. The first polarizing plate 206 converts the light output from the backlight 100 into linearly polarized light. The second polarizing plate 207 transmits or blocks light depending on the orientation state (modulation amount) of liquid crystals in the liquid crystal layer 203.

As illustrated in FIG. 3, the backlight 100 includes a light guide 10, the light source 20, an inner frame 30, and a back cover 40. The light guide 10 is a plate-like member including a light guide plate 11 and has a rectangular shape in planar view, for example. As illustrated in FIGS. 2 and 3, the light guide 10 includes the light guide plate 11, a reflective sheet 12, a first lens sheet 13, a second lens sheet 14, and a diffusion sheet 15, for example.

The reflective sheet 12 is provided on the bottom surface of the light guide plate 11. The reflective sheet 12 reflects light leaking from the light guide plate 11 and causes the light to enter the light guide plate 11. The first lens sheet 13, the second lens sheet 14, and the diffusion sheet 15 are sequentially stacked on the top surface of the light guide plate 11. The first lens sheet 13 and the second lens sheet 14 increase the directivity of light output from the top surface of the light guide plate 11. The diffusion sheet 15 appropriately diffuses the light the directivity of which is increased by the first lens sheet 13 and the second lens sheet 14. The reflective sheet 12, the first lens sheet 13, the second lens sheet 14, and the diffusion sheet 15 are provided as needed and are not necessarily provided.

As illustrated in FIG. 3, the light source 20 is arranged on the one side of the light guide 10. The light source 20 faces the side surface of the light guide 10 and causes light to enter the light guide 10. Part of the side surface of the light guide 10 serves as a light incident surface on which the light from the light source 20 is incident. The light source 20 may be provided along the long side or the short side of the light guide 10 and have a desired form. The light source 20 may include a plurality of point-like light emitters (e.g., light-emitting diodes) or one linear light emitter (e.g., a cold-cathode tube).

The light source 20 includes a plurality of light emitters 21 and a light source mounting board 22, for example. The light emitters 21 are light-emitting diodes. The light emitters 21 are mounted on the light source mounting board 22. While FIG. 3 illustrates only one light emitter 21, the light emitters 21 are arranged side by side along the side surface of the light guide 10.

As illustrated in FIGS. 2 and 3, the light guide 10 is attached to the inner frame 30. The inner frame 30 has a first bottom plate 31 and a first frame 32. The first bottom plate 31 supports the bottom surface of the light guide 10. The first frame 32 protrudes from the first bottom plate 31 toward the light guide 10 side to surround the outer periphery of the light guide 10. The light guide 10 is accommodated in a space surrounded by the first frame 32.

The inner frame 30 is attached to the back cover 40. The back cover 40 has a second bottom plate 41 and a second frame 42. The second bottom plate 41 supports the bottom surface of the inner frame 30. The second frame 42 protrudes from the second bottom plate 41 toward the inner frame 30 side to surround the outer periphery of the first frame 32. The inner frame 30, the light guide 10, and the light source 20 are accommodated in a space surrounded by the second frame 42. The light source 20 may be attached to a cut-out formed in the first frame 32 or to the second frame 42.

The configuration of the backlight 100 described above is given by way of example only. Various changes, omission, and addition of the members may be appropriately made.

As illustrated in FIGS. 2 and 3, the backlight 100 is incorporated in the backlight frame 60. The backlight frame 60 has a top surface cover portion 61, a side surface cover portion 62, and a protrusion 63. The side surface cover portion 62 is a frame-like member covering the sides of the backlight 100. The back cover 40 is fit into the backlight frame 60 with the outer surface of the second frame 42 of the back cover 40 arranged along the inner surface of the side surface cover portion 62.

The top surface cover portion 61 extends in the horizontal direction from the upper end of the side surface cover portion 62 to cover the outer periphery of the top surface of the light guide 10. The top surface cover portion 61 has an opening 65 that transmits light output from the light guide 10 to the display panel 200.

The protrusion 63 protruding toward the display panel 200 is provided on the top of the top surface cover portion 61. The display panel 200 is bonded to the top of the protrusion 63 with an adhesive member 70 interposed therebetween. In this manner, the display panel 200 is fixed to the backlight 100 with the backlight frame 60, and the display apparatus 1 is thus provided. The display apparatus 1 may further include a cover member 301 on the top of the display panel 200 with an adhesive layer 310 interposed therebetween. The cover member 301 is provided to protect the display panel 200 and may be a glass substrate or a resin substrate, for example.

Figure 4:
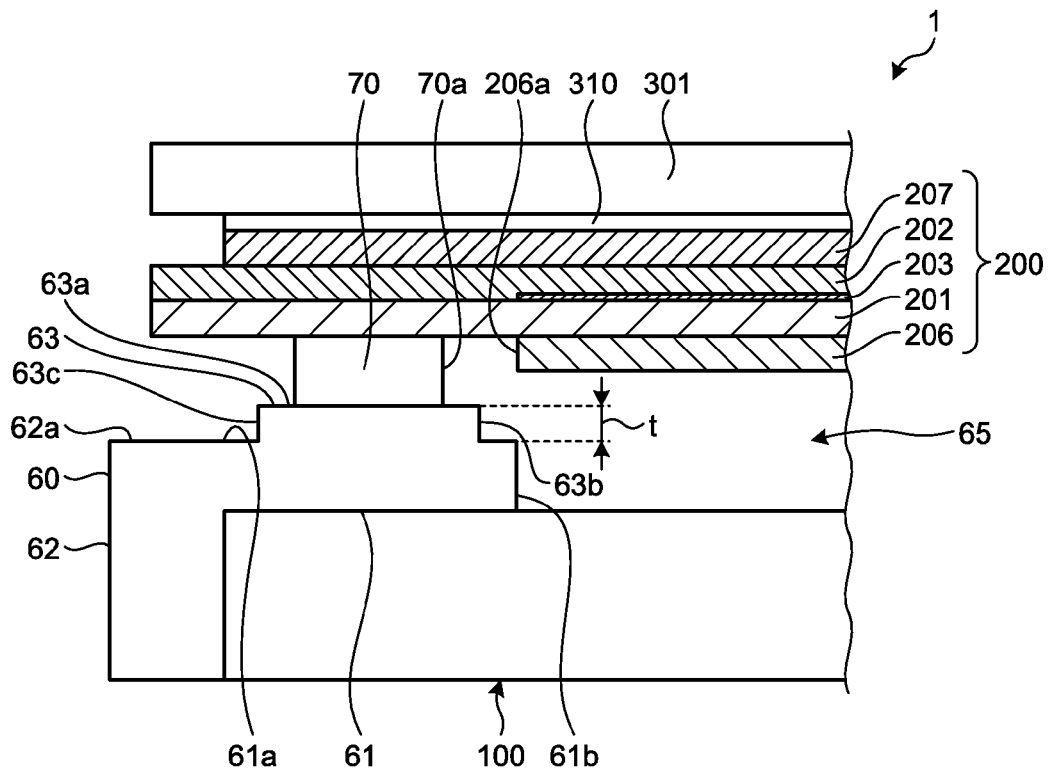
FIG. 4 is a sectional view schematically illustrating the display apparatus according to the first embodiment.
Figure 5:
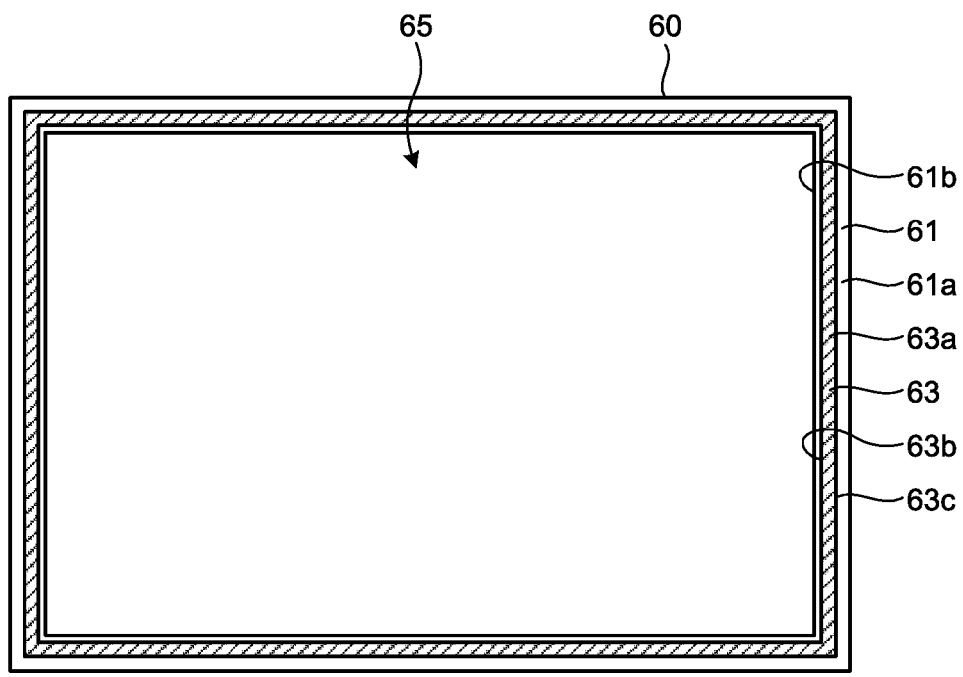
FIG. 5 is a plan view of a backlight frame.

The following describes the structure of the bonded portion between the backlight frame 60 and the display panel 200 with reference to FIGS. 4 and 5. FIG. 4 is a sectional view schematically illustrating the display apparatus according to the first embodiment. FIG. 5 is a plan view of the backlight frame. FIG. 4 simplifies the configuration of the backlight 100. In the present specification, an inner side indicates a position on the center side of the region surrounded by the backlight frame 60 in planar view. An outer side indicates a position on the outer side of the region surrounded by the backlight frame 60 in planar view.

As illustrated in FIG. 4, the protrusion 63 of the backlight frame 60 protrudes upward from a top surface 61a of the top surface cover portion 61. The adhesive member 70 is provided on a top surface 63a of the protrusion 63. The bottom surface of the first substrate 201 of the display panel 200 is bonded to the backlight frame 60 with the adhesive member 70 interposed therebetween. The adhesive member 70 has elasticity and can be deformed in accordance with the space between the protrusion 63 and the first substrate 201. The adhesive member 70 can employ a cushion tape, for example, and is made of an elastic urethane-based resin material.

With this configuration, stress applied to the display panel 200 is absorbed by the adhesive member 70, thereby suppressing damage to the display panel 200. Assume a case where a process of applying the adhesive layer 310 to the top of the display panel 200 to bond the cover member 301 is performed after the display panel 200 is bonded to the backlight frame 60. In this case, stress applied to the display panel 200 is absorbed by the adhesive member 70, thereby suppressing damage to the display panel 200.

As illustrated in FIG. 4, the first polarizing plate 206 is provided on the surface of the first substrate 201 to which the backlight frame 60 is bonded, and is arranged on the inner side of the backlight frame 60 than the adhesive member 70. A side surface 206a of the first polarizing plate 206 faces a side surface 70a of the adhesive member 70 with a space interposed therebetween. The protrusion 63 has a first side surface 63b and a second side surface 63c. The first side surface 63b faces the inner side of the backlight frame 60. The second side surface 63c faces the outer side of the backlight frame 60. The first side surface 63b is arranged on the outer side than a side surface 61b of the top surface cover portion 61. The first polarizing plate 206 is arranged on the inner side than the first side surface 63b of the protrusion 63. This configuration can prevent contact of the first polarizing plate 206 with the top surface cover portion 61.

The side surface 206a of the first polarizing plate 206 in FIG. 4 is arranged on an extended line of the side surface 61b of the top surface cover portion 61 near the difference in level between the first side surface 63b and the side surface 61b, but the present disclosure is not limited thereto. The side surface 206a of the first polarizing plate 206 may be positioned between the first side surface 63b of the protrusion 63 and the side surface 61b of the top surface cover portion 61 or on the inner side than the side surface 61b of the top surface cover portion 61.

As illustrated in FIG. 5, the backlight frame 60 is a frame-like member. The top surface cover portion 61 and the protrusion 63 are continuously provided so as to surround the opening 65. For easier understanding, the top surface 63a of the protrusion 63 is hatched in FIG. 5. The adhesive member 70 may be continuously provided along the entire periphery of the protrusion 63 so as to surround the opening 65. In other words, the protrusion 63 and the adhesive member 70 are provided so as to surround the first polarizing plate 206 in planar view. The adhesive member 70 is not limited to the above configuration, and a plurality of adhesive members 70 may be provided along each side of the protrusion 63. The adhesive member 70 is not necessarily provided continuously along the entire periphery, and some spaces may be formed in part of the adhesive member 70.

With this configuration, the first polarizing plate 206 is arranged in the space surrounded by the first substrate 201, the adhesive member 70, the backlight frame 60, and the backlight 100. This configuration can suppress damage to the first polarizing plate 206 in the assembly process of the display apparatus 1, for example. Even in a case where the adhesive layer 310 protrudes from the top of the display panel 200 when it is applied to the top of the display panel 200 as described above, for example, the protrusion 63 and the adhesive member 70 can prevent inflow of the adhesive layer 310 toward the first polarizing plate 206. This configuration thus can prevent contact of the adhesive layer 310 with the first polarizing plate 206, thereby preventing a crack or the like in the first polarizing plate 206. The adhesive layer 310 can employ a translucent ultraviolet-curable liquid adhesive, for example. Curing the adhesive member 310 allows the cover member 301 to be bonded to the display panel 200.

Narrowing the frame of the display apparatus 1 requires a smaller width of the adhesive member 70 and increased accuracy of the attachment position of the adhesive member 70. In the present embodiment, the protrusion 63 is used as a reference of the attachment position to attach the adhesive member 70. Specifically, the adhesive member 70 is attached to the top surface 63a so as to be arranged between the first side surface 63b and the second side surface 63c of the protrusion 63 in planar view. If the adhesive member 70 protrudes outward from the first side surface 63b or the second side surface 63c, the protrusion can be visually checked with ease.

The configuration enables accurate attachment of the adhesive member 70 to the backlight frame 60 even if the width of the adhesive member 70 is reduced. Arranging the adhesive member 70 on the backlight frame 60 with high positional accuracy can prevent placement of the first polarizing plate 206 over the adhesive member 70 when bonding the display panel 200 to the adhesive member 70. In addition, the configuration enables downsizing of the display apparatus 1 by reducing the space between the adhesive member 70 and the first polarizing plate 206.

The top surface cover portion 61, the side surface cover portion 62, and the protrusion 63 of the backlight frame 60 are integrally formed using a resin material. There is no need for providing a guide or an extra member serving as a reference of the position of the adhesive member 70. The configuration thus requires a reduced number of parts, thereby simplifying the assembly process of the display apparatus 1.

In the present embodiment, arranging the protrusion 63 can reduce the thickness of the adhesive member 70 by a height t of the protrusion 63 while maintaining the space between the display panel 200 and the backlight 100, thereby lowering manufacturing cost of the display apparatus 1. The larger thickness of the adhesive member 70 than the thickness of the first polarizing plate 206 can prevent contact of the first polarizing plate 206 with the backlight frame 60. The height t of the protrusion 63 is 0.2 mm to 1.0 mm, e.g., about 0.4 mm.

The display panel 200 extends to regions near the outer ends of the backlight frame 60. In other words, a top end 62a of the side surface cover portion 62 is positioned below the top surface 63a of the protrusion 63 and faces the bottom surface of the first substrate 201. In this configuration, the backlight frame 60 is not provided at a position facing the side surfaces of the first substrate 201 and the second substrate 202 in the lateral direction of the display panel 200, thereby enabling downsizing of the display apparatus 1.

The display panel 200 is fixed to the backlight frame 60 only with the adhesive member 70 interposed therebetween. In other words, no other member, such as a housing and a frame, is provided to fix the display panel 200 to the backlight frame 60. Consequently, the configuration enables downsizing of the display apparatus 1. Further, in the configuration, not providing the backlight frame 60, a housing, and other members above the display panel 200 can facilitate attachment of the cover member 301 and other members to the top of the display panel 200.

As described above, the display apparatus 1 according to the present embodiment includes the display panel 200, the backlight 100 (illuminator), and the backlight frame 60. The display panel 200 includes the first substrate 201 provided with the liquid crystal layer 203 (display functional layer), and the first polarizing plate 206. The backlight 100 outputs light to the display panel 200. The backlight frame 60 surrounds the sides of the backlight 100 and has the first substrate 201 bonded to the top thereof through the adhesive member 70. The first polarizing plate 206 is provided on the surface of the first substrate 201 to which the backlight frame 60 is bonded, and is arranged on the inner side of the backlight frame 60 than the adhesive member 70 in planar view.

In this configuration, arranging the first polarizing plate 206 in the space surrounded by the first substrate 201, the adhesive member 70, the backlight frame 60, and the backlight 100, and not exposing the first polarizing plate 206 to the outer side than the adhesive member 70 can suppress damage to the first polarizing plate 206 in the assembly process of the display apparatus 1, for example.

In the present embodiment, the backlight frame 60 has the protrusion 63 protruding toward the first substrate 201, and the adhesive member 70 is provided on the top of the protrusion 63. This configuration can increase the accuracy of the attachment position of the adhesive member 70 using the protrusion 63 as a reference of the attachment position when attaching the adhesive member 70 to the backlight frame 60. Higher accuracy of the attachment position of the adhesive member 70 can reduce the width of the adhesive member 70 and the space between the adhesive member 70 and the first polarizing plate 206, thereby enabling downsizing of the display apparatus 1.

Modification

Figure 6:
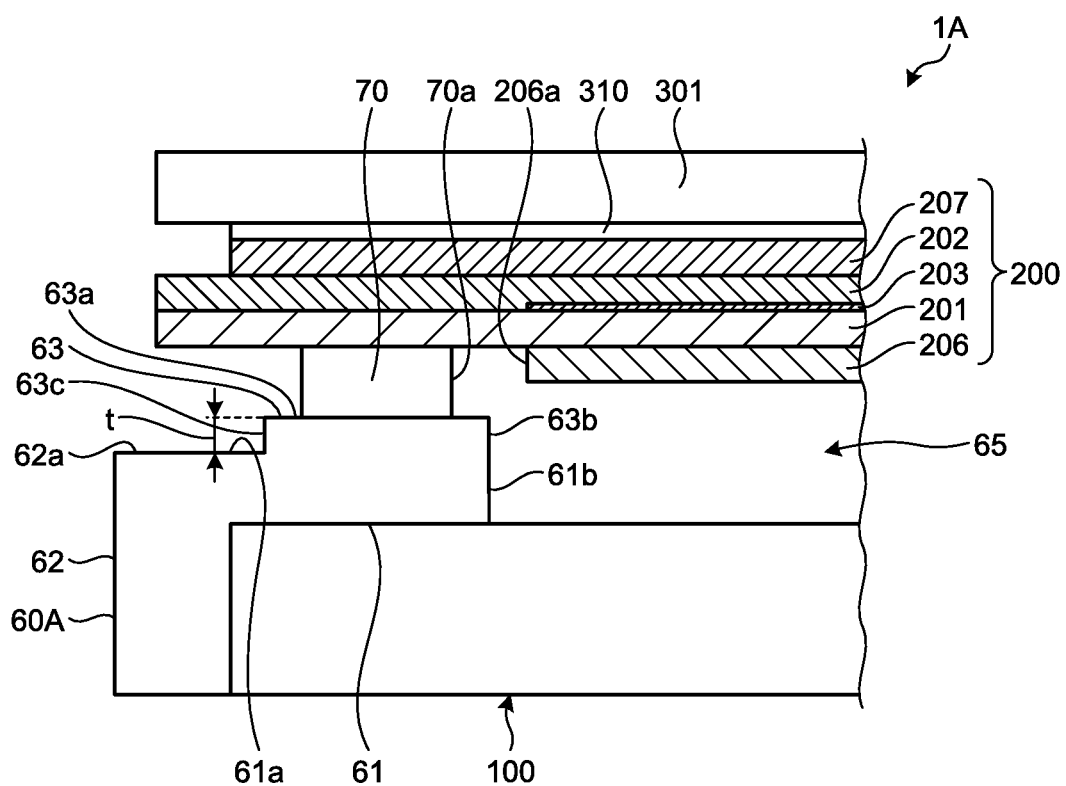
FIG. 6 is a sectional view schematically illustrating a display apparatus according to a modification of the first embodiment.

FIG. 6 is a sectional view schematically illustrating a display apparatus according to a modification of the first embodiment. The shape of a backlight frame 60A in a display apparatus 1A according to the present modification is different from that of the backlight frame 60 according to the first embodiment. As illustrated in FIG. 6, the first side surface 63b of the protrusion 63 is aligned with the side surface 61b of the top surface cover portion 61. This configuration also enables accurate attachment of the adhesive member 70 to the protrusion 63 using the first side surface 63b and the second side surface 63c of the protrusion 63 as a reference. The configuration thus can reduce the width of the adhesive member 70, thereby enabling downsizing of the display apparatus 1A.

The top surface cover portion 61 according to the present modification does not extend to the inner side than the first side surface 63b of the protrusion 63. The configuration can reduce the width of the top surface cover portion 61, thereby narrowing the frame of the display apparatus 1A.

In the present modification, the first polarizing plate 206 is also arranged on the inner side of the backlight frame 60A than the adhesive member 70. The configuration can prevent the first polarizing plate 206 from being exposed to the outer side than the adhesive member 70, thereby suppressing damage to the first polarizing plate 206.

Second Embodiment

Figure 7:
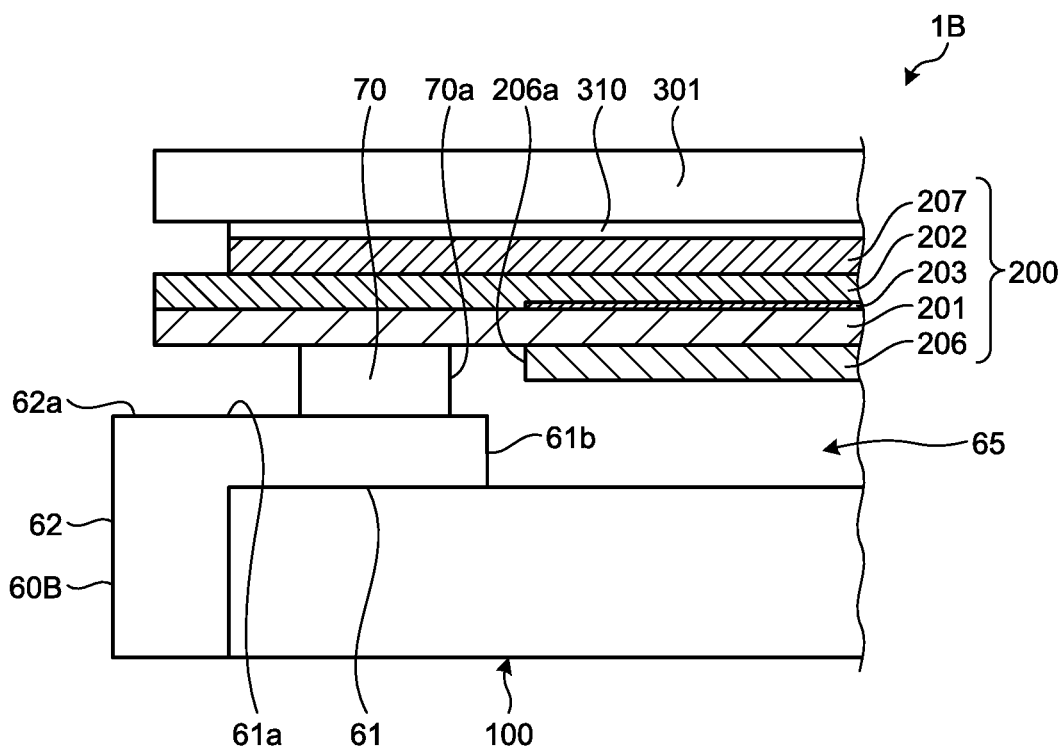
FIG. 7 is a sectional view schematically illustrating a display apparatus according to a second embodiment of the present disclosure.

FIG. 7 is a sectional view schematically illustrating a display apparatus according to a second embodiment of the present disclosure. A display apparatus 1B according to the present embodiment is different from the display apparatuses 1 and 1A in that no protrusion is formed on a backlight frame 60B. As illustrated in FIG. 7, the adhesive member 70 is provided on the top surface 61a of the top surface cover portion 61. The bottom surface of the first substrate 201 of the display panel 200 is bonded to the adhesive member 70. As a result, the display panel 200 is bonded to the backlight frame 60B with the adhesive member 70 interposed therebetween.

In the present embodiment, simplifying the configuration of the backlight frame 60B can reduce manufacturing cost of the display apparatus 1B. Not providing a protrusion can increase the flexibility in the width and the attachment position of the adhesive member 70, thereby facilitating a design change.

In the present embodiment, the first polarizing plate 206 is also arranged on the inner side than the adhesive member 70. In other words, the first polarizing plate 206 is arranged in the space surrounded by the first substrate 201, the adhesive member 70, the backlight frame 60B, and the backlight 100. Thus, not exposing the first polarizing plate 206 to the outer side than the adhesive member 70 can suppress damage to the first polarizing plate 206 in the assembly process of the display apparatus 1, for example.

Third Embodiment

Figure 8:
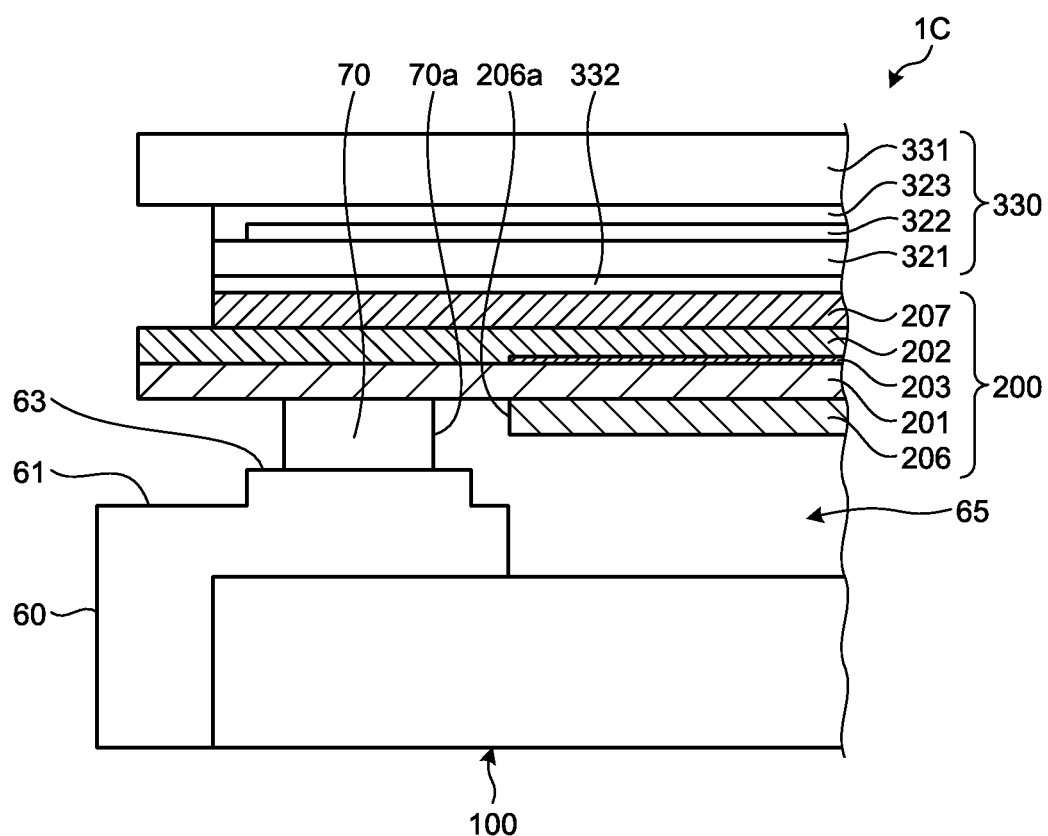
FIG. 8 is a sectional view schematically illustrating a display apparatus according to a third embodiment of the present disclosure.

FIG. 8 is a sectional view schematically illustrating a display apparatus according to a third embodiment of the present disclosure. The display apparatuses 1, 1A, and 1B each include the cover member 301, such as a glass substrate, on the top of the display panel 200, but the present disclosure is not limited thereto. As illustrated in FIG. 8, a display apparatus 1C according to the present embodiment includes a touch panel 330 on the top of the display panel 200 with an adhesive layer 332 interposed therebetween.

The touch panel 330 includes a base material 321, a detection electrode layer 322, an adhesive layer 323, and a cover member 331. The base material 321 is a glass substrate or a translucent resin substrate. The bottom surface of the base material 321 is bonded to the display panel 200 with the adhesive layer 332 interposed therebetween. The detection electrode layer 322 is provided on the top surface of the base material 321.

The detection electrode layer 322 includes a plurality of electrodes that detect an external object coming into contact with or in proximity to the cover member 331. The detection electrode layer 322 is made of a translucent conductive material, such as indium tin oxide (ITO). The touch panel 330 is a capacitance touch panel, for example. The electrodes in the detection electrode layer 322 are arranged so as to form capacitance between the external object and the electrodes or between the electrodes.

The cover member 331 is provided on the top of the base material 321 and the detection electrode layer 322 with the adhesive layer 323 interposed therebetween. The cover member 331 is a glass substrate or a translucent resin substrate, for example.

The display panel 200, the backlight 100, the backlight frame 60, and the adhesive member 70 according to the present embodiment have the same configurations as those of the display apparatus 1 according to the first embodiment. As illustrated in FIG. 8, the first polarizing plate 206 is arranged on the inner side than the adhesive member 70 provided to the protrusion 63. In other words, the first polarizing plate 206 is arranged in the space surrounded by the first substrate 201, the adhesive member 70, the backlight frame 60, and the backlight 100. Thus, not exposing the first polarizing plate 206 to the outer side than the adhesive member 70 can suppress damage to the first polarizing plate 206.

There may be a case where the touch panel 330 is bonded to the display panel 200 using a liquid adhesive after the display panel 200 is bonded to the backlight frame 60, for example. Even when the liquid adhesive protrudes outward from the display panel 200 in this process, the adhesive member 70 can prevent inflow of the adhesive toward the first polarizing plate 206, thereby suppressing damage to the first polarizing plate 206.

The display panel 200 is fixed to the backlight frame 60 only with the adhesive member 70 interposed therebetween. In other words, no other member, such as a housing, is provided to surround the top surface and the side surfaces of the display panel 200, thereby enabling downsizing of the display apparatus 1C. The configuration provides no constraint by the backlight frame 60, a housing, and other members, and thus can facilitate attachment of the touch panel 330 to the top of the display panel 200.

The exemplary embodiments of the present disclosure have been described above, but they are not intended to limit the disclosure. The contents disclosed in the embodiments are given by way of example only, and various changes may be made without departing from the spirit of the disclosure. The changes appropriately made without departing from the spirit of the disclosure are naturally fall within the scope of the disclosure. At least one of various omissions, substitutions, and changes of the components may be made without departing from the spirit of the embodiments above and the modification thereof.

What is claimed is:

1. A display apparatus comprising:
    a display panel including a substrate provided with a display functional layer, and a polarizing plate, the display panel having sides along a first direction and a second direction;
    an illuminator configured to output light to the display panel;
    a frame that surrounds sides of the illuminator;
    a protrusion included in the frame, the protrusion protruding toward the substrate and having a width in the first direction;
    an adhesive member through which the substrate is bonded at a top of the protrusion of the frame, the adhesive member having a width in the first direction, wherein
    the polarizing plate is provided on a surface of the substrate to which the frame is bonded, and is arranged on an inner side of the frame than the adhesive member in planar view, and
    the width of the adhesive member is smaller than the width of the protrusion which the adhesive member is in direct contact with.

2. The display apparatus according to claim 1, wherein the polarizing plate is arranged on an inner side than the protrusion.

3. The display apparatus according to claim 1, wherein the adhesive member is provided along an entire periphery surrounding the polarizing plate in planar view.

4. The display apparatus according to claim 1, wherein the display panel is fixed to the frame through the adhesive member alone.

5. The display apparatus according to claim 1, wherein the display panel extends to a region near an outer end of the frame.

6. The display apparatus according to claim 1, wherein
    a cover member is provided to the display panel on an opposite side of the frame side, and
    the cover member is fixed to the display panel through an adhesive layer.

7. The display apparatus according to claim 1, wherein a thickness of the adhesive member is larger than a thickness of the polarizing plate.

8. The display apparatus according to claim 1, wherein the adhesive member has elasticity.

9. The display apparatus according to claim 1, wherein
    the protrusion has a height from a top surface of the frame to a bottom surface of the adhesive member in a third direction vertical to the substrate, and
    the height of the protrusion plus the height of the adhesive member is a distance between the top end of the frame to the substrate in the third direction.

* * * * *